United States Patent
Kuo et al.

(10) Patent No.: US 11,151,022 B1
(45) Date of Patent: Oct. 19, 2021

(54) TESTING OF EXECUTABLE CODE FOR LOCAL DEVICE COORDINATOR

(71) Applicant: Amazon Technologies, Inc., Seattle, WA (US)

(72) Inventors: Calvin Yue-Ren Kuo, Mercer Island, WA (US); Nicolas Webb, Bothell, WA (US); Georgie Mathews, Seattle, WA (US); Yen-Lin Chen, Irvine, CA (US); Simon Poile, Newcastle, WA (US); Victor Gails, Seattle, WA (US); Kadirvelu Rathnavelu, Seattle, WA (US); Shirley Zheng, Seattle, WA (US); Feng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/721,293

(22) Filed: Sep. 29, 2017

(51) Int. Cl.
*G06F 11/36* (2006.01)
*G06F 8/60* (2018.01)

(52) U.S. Cl.
CPC ............ *G06F 11/3688* (2013.01); *G06F 8/60* (2013.01)

(58) Field of Classification Search
CPC .............................. G06F 8/60; G06F 11/3688
USPC ......................................................... 717/131
See application file for complete search history.

(56) References Cited

U.S. PATENT DOCUMENTS

| | | | | |
|---|---|---|---|---|
| 6,971,018 B1* | 11/2005 | Witt | ............... | G06F 21/52 705/57 |
| 7,286,953 B1* | 10/2007 | Li | ............... | G01R 1/025 702/108 |
| 9,146,764 B1* | 9/2015 | Wagner | ............... | G06F 9/50 |
| 2005/0155077 A1* | 7/2005 | Lawrence | ............... | H04N 21/4113 725/109 |
| 2013/0007520 A1* | 1/2013 | Giammarresi | ...... | G06F 11/2294 714/32 |
| 2015/0082289 A1* | 3/2015 | Leinfellner | ............... | G06F 11/3688 717/134 |
| 2015/0339216 A1* | 11/2015 | Wade | ............... | G06F 11/3668 714/38.1 |
| 2017/0168777 A1* | 6/2017 | Britt | ............... | G06F 8/20 |
| 2017/0323027 A1* | 11/2017 | Nguyen | ............... | A63F 13/70 |
| 2018/0234478 A1* | 8/2018 | Das | ............... | H04L 65/604 |
| 2018/0302443 A1* | 10/2018 | Weiss | ............... | G06F 21/74 |

OTHER PUBLICATIONS

Collins et al, "An Industrial Experience on the Application of Distributed Testing in an Agile Software Development Environment". 2012, [Online], pp. 190-194, [Retrieved from interneton May 14, 2021], <https://ieeexplore.ieee.org/stamp/stamp.jsp?arnumber=6337365> (Year: 2012).*

* cited by examiner

*Primary Examiner* — S. Sough
*Assistant Examiner* — Zengpu Wei
(74) *Attorney, Agent, or Firm* — Knobbe, Martens, Olson & Bear, LLP

(57) ABSTRACT

Systems and methods are described for implementing a framework for testing on-demand code execution that is configured to be executed on coordinated devices. The testing framework allows the execution of tasks in a network based on-demand system. The resulting generation of an I/O file for accessing local resources can be intercepted and either processed via a handler process or transmitted to the local resource.

19 Claims, 10 Drawing Sheets

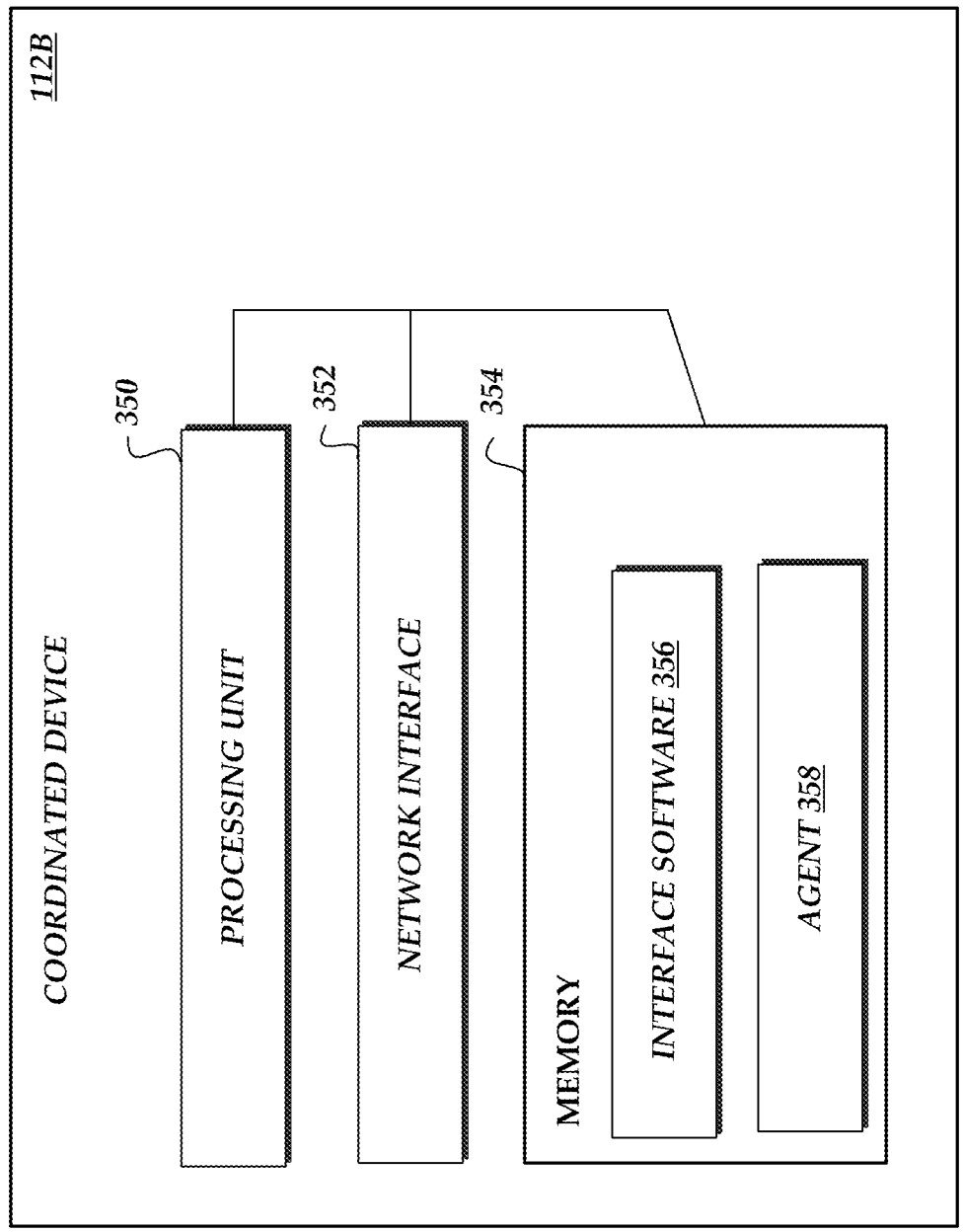

TESTING OF EXECUTABLE CODE FOR LOCAL DEVICE COORDINATOR

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality. In some instances, the local user interfaces of these embedded devices or thin devices are limited, and thus remote management may be required to implement some functions of these devices. However, remote management can in some instances be problematic, due to latency in communications with a remote management device and potential for private information to be inadvertently disclosed either at the remote management device or during communications with the remote management device. These issues may be more prevalent when the embedded devices or thin devices and the remote management device exist on separate communication networks or communicate over public communications networks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 3A and 3B depict general architectures of coordinated devices managed by the coordinator of FIG. 1;

DETAILED DESCRIPTION

Figure 1:
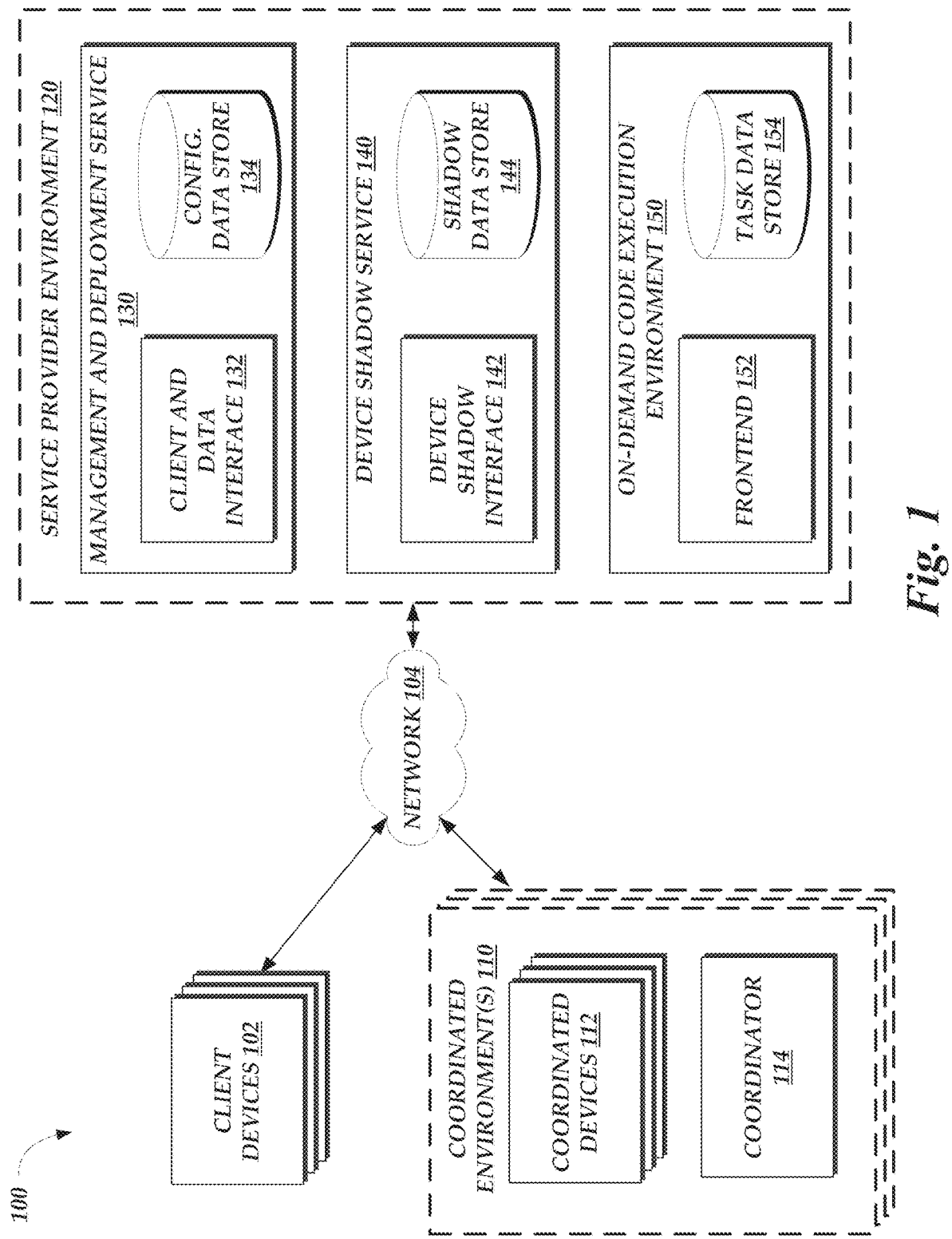
FIG. 1 is a block diagram depicting an illustrative environment in which a coordinator can operate to locally manage and coordinate operation of coordinated devices within a coordinated environment, and wherein the coordinator may communicate with client devices and a service provider environment to modify operation of the coordinator.

Generally described, aspects of the present disclosure relate to a coordinator present within a coordinated environment to control operation and functionality of coordinated devices within the coordinated environment. In some instances, coordinated devices may correspond to embedded devices or thin devices that have at least one alternative primary function, such as household appliances having a separate primary purpose. Such devices may in some instances be referred to as "Internet-of-Things" devices, or "IoT" devices. Coordinated devices may include access to computing device resources, and may thus benefit from remote management. For example, a coordinated device may be configured with a graphical processing unit, or GPU, that can be accessed as a computing device resource during the execution of executable code by the coordinate device. The coordinator disclosed herein enables such remote management of coordinated devices locally, within an environment including the coordinator and the coordinated devices (such as a local area network, or "LAN," environment).

Use of a coordinator can thus enable management of coordinated devices without requiring communications external to the local environment, thereby allowing a reduction in privacy risks and an increase in communication speed over the use of external or public communication networks. Specifically, aspects of the present disclosure relate to the utilization of a coordinator as a localized on-demand code execution system, enabling rapid execution of portable segments of code to implement functions on the coordinator. These portable segments of code may be referred to herein as "tasks." In some instances, tasks may be utilized to coordinate functionality of a coordinated device, such as by changing the state of the device. For example, where a coordinated device is a network-enabled light, a task may function to change the state of the light (e.g., to "on" or "off") according to an input to the coordinator, such as the current time, a user input, or the state of another coordinated device. The coordinator may further enable communication coordinated devices and tasks according to a number of different protocols, and in some instances provide translation functions between such protocols. Still further, the coordinator may in some instances manage an execution location of a task, such that the task may be executed on the coordinator, on a coordinated device, or on a device of a remote environment (e.g., a remote network computing environment), according to capabilities of candidate devices and requirements for execution of the task. These tasks may in some instances be user-defined, enabling users to implement a variety of functionalities on the coordinator or coordinated devices, according to user-submitted code corresponding to the task. Thus, a coordinator may provide rapidly reconfigurable localized management of coordinated devices.

Generally described, the typical deployment cycle for tasks, or other on-demand executable code intended for a coordinated device, includes the generation of the executable code, transmission of the executable code to the coordinator, processing of the received code by the coordinator, deployment of the processed code (e.g., tasks) to a selected coordinated device for execution. During the development and testing of executable code, the deployment of the task is further followed by testing of the coordinated device during the execution of a deployed task.

In embodiments in which local resources of coordinated devices are accessed during the execution of a task, the development and testing of executable code can become inefficient. More specifically, in embodiments in which local resources are accessed during execution of a task, the typical testing framework requires that the specific coordinated device must execute the task. If the executable code requires various iterations of change, often in rapid succession, the efficiency in transmitting the executable code to the coordinator, processing, and deployment to the coordinated device increases in inefficiency.

In accordance with embodiments of the present disclosure, a coordinator may be associated with a user, who transmits executable code of the coordinator. To facilitate testing of the executable code intended for a coordinated device, the coordinator directs the execution of the executable code to the on-demand code execution environment within a service provider network. As described herein, the service provider may utilize an existing instance (e.g., warmed up) to execute the task. Alternatively, the service provider may instantiate a new instance for purposes of executing the task.

Illustratively, to access local resources on a coordinated device, the local resources accessible via the specific coordinated device are accessed via an input/output ("I/O") file that is written by the coordinated device. Each respective I/O file is defined as having specific inputs and outputs that are to be generated during the execution of the task by the coordinated device. Accordingly, the resulting execution of tasks associated with local resources will generally cause the coordinated device to generate outputs to the I/O file and access the inputs resulting from outputs of the resource from the I/O file.

In accordance with an embodiment of the present application, to facilitate testing, an instance on the service provider network executes the tasks intended for the coordinated device. Additionally, the service provider network is further configured with a handler function that processes the I/O file to receive the data generated by the execution of the task and provide the expected outputs that would be generated by the local resource. As task-executing instance attempts to write the I/O file, the service provider intercepts the write function and forwards to the handler function. Accordingly, a customer/administrator can more efficiently generate version of executable code that is executed at the service provider network and does not require access to the local resources of coordinated devices.

In accordance with different embodiments of the present disclosure, a coordinator may be associated with a user, who transmits executable code of the coordinator. To facilitate testing of the executable code intended for a coordinated device, the coordinator directs the execution of the executable code to the on-demand code execution environment within a service provider network. As described above, the service provider may utilize an existing instance (e.g., warmed up) to execute the task. Alternatively, the service provider may instantiate a new instance for purposes of executing the task.

As described above, to access local resources on a coordinated device, the local resources accessible via the specific coordinated device are accessed via an I/O file that is written by the coordinated device. Each respective I/O file is defined as having specific inputs and outputs that are to be generated during the execution of the task by the coordinated device. In some embodiments, however, the response/outputs generated by the local resources may be unknown or too complicated to be able to emulate as described in the previous embodiment. Accordingly, the resulting execution of tasks associated with local resources will generally cause the coordinated device to generate outputs to the I/O file and access the inputs resulting from outputs of the resource from the I/O file. Additionally, in this embodiment, the coordinated devices with local resources include a communication agent that is configured to establish a communication channel between the coordinated device and the service provider network as described herein.

In accordance with an alternative embodiment of the present application, to facilitate testing, an instance on the service provider network executes the tasks intended for the coordinated device. As task-executing instance attempts to write the I/O file, the service provider intercepts the write function and forwards to the handler function. Rather than providing the intercept communication to a handler function, as described above, the service provider utilizes the communication channel between the service provider network and the agent to provide the I/O file to the local resource on the coordinated device. The local resource would process the I/O file and generate outputs based on the execution. In turn, the agent would transmit, via the communication channel, the results to the instance. Accordingly, a customer/administrator can more efficiently generate version of executable code that is executed at the service provider network while utilizing access to the local resources of coordinated devices.

In both of the above described embodiments, the service provider can designate executable code as for testing purposes. In such embodiments, the service provider can omit some of the establish checks and validations in order to facilitate a more rapid deployment of executable code for testing.

As will be appreciated by one of skill in the art in light of the present disclosure, the embodiments disclosed herein improves the ability of computing systems, and particularly computing systems with limited localized user interfaces, to be coordinated and managed by an external device. Specifically, the present disclosure provides a highly configurable coordinator to coordinate and manage devices within a coordinated environment in a reliable manner, while reducing or eliminating the need for communications via external or public communication networks. Thus, the embodiments disclosed herein provide more responsive control of coordinated devices (due, for example, to reduced latency of communications), as well as increased security in coordinated devices (due, for example, to a lack of need to communicate via public networks). Thus, the present disclosure represents an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100, including one or more coordinated environments 110 in which a coordinator 114 may operate to control coordinated devices 112, as well client devices 102 that may interact with the coordinated environments 110 (e.g., to request a change in state of a coordinated device 112), and a service provider environment 120 that may assist in communications with or configuration of the coordinators 114 in various coordinated environments 110.

The coordinated environments 110, client devices, and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein.

While some embodiments disclosed herein may utilize known protocols, such as MQTT, accord to a standard implementation of such protocols, other embodiments may vary the implementation of such protocols. For example, standardized MQTT can utilize a "keep alive" functionality, whereby a client and broker must exchange either normal data or a specialized keep-alive message (e.g., an MQTT ping) within a threshold period of time (a "keep-alive" threshold), or the connection is assumed to be broken. However, the overhead created by specialized keep-alive messages may be undesirable within coordinated environments 112. Thus, some embodiments of the present application may implement a variable keep-alive threshold, whereby the keep-alive threshold is increased as keep-alive messages are transmitted, until an error occurs in communication. Illustratively, where a first keep-alive threshold expires, results in client transmission of a keep-alive message, and the client obtains a keep-alive response from a broker, the client may increase the keep-alive threshold for subsequent transmissions by some amount (e.g., 50%, n ms, etc.), potentially reaching a maximum amount. Where a first keep-alive threshold expires, results in client transmission of a keep-alive message, and the client does not obtain a keep-alive response from a broker, the client may descrease the keep-alive threshold for subsequent transmissions either by some amount (e.g., 50%, n ms, etc.) or to a default minimum value. Thus, as keep-alive messages are transmitted and acknowledged, the keep-alive threshold for subsequent transmissions can be increased, reducing bandwidth used to support such transmissions. These variations to the MQTT may be particularly beneficial in environments 110 with low-bandwidth or high congestion.

Each coordinated environment 110 may include a coordinator 114 and any number of coordinated devices 112, in communication via a network of the execution environment 110 (which network is not shown in FIG. 1). Because of their association within the coordinated environment 110, the coordinated devices 112 and coordinator 114 within a given environment 110 may be considered "local" to one another, in terms of communications network. For example, the coordinated devices 112 and coordinator 114 within a given environment 110 may be connected via a LAN or other localized communication network. The coordinated devices 112 and coordinator 114 may communicate with one another over such a localized communication network, in accordance with the embodiments described herein. In some instances, communications between a coordinated devices 112 and coordinator 114 may be encrypted, such as via Transport Layer Security cryptographic protocol. Illustratively, a coordinator 114 may be provisioned with a security certificate that verifies a digital identify of the coordinator. The security certificate may be signed by a public certificate authority or a private certificate authority (e.g., established by the service provider environment 120).

Each coordinated device 112 can correspond to a computing device configured to communicate with the coordinator 114 to manage functionality of the coordinated device 112. In some instances, coordinated devices 112 can correspond to fully featured computing devices, such as laptops, desktops, standalone media players, etc., with robust localized user interface capabilities. In other instances, coordinated devices 112 can correspond to thin devices or embedded devices associated with another primary function, such as an device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 112 may include limited local user interfaces, and be configured for remote management. In some instances, coordinated devices 112 may be stateful, and operate to alter their state in response to instructions (e.g., by turning from "off" to "on," etc.).

As described in more detail below (e.g., with respect to FIG. 2), the coordinator 114 can correspond to a computing device executing instructions to coordinate, manage, or control operation of the coordinated devices 112, without requiring that instructions transmitted to the coordinated devices 112 travel outside the coordinated environments 110 (thus increase the security of such instructions and increasing the speed of their transmission). Specifically, the coordinator 114 can include a processor and memory collectively configured to manage communications between any combination of coordinated devices 112, client devices 102, and devices of the service provider network 120. The coordinator can further be configured to enable executions of tasks, in a manner similar to an on-demand code execution environment 120 of the service provider environment 120. These tasks may implement a variety of user-defined or non-user-defined functionalities, including communicating with coordinated devices 112, client devices 102, and devices of the service provider network 120. As such, the coordinator 114 can be configured to allow for manual, automatic, or semi-automatic control of coordinated devices 112. For example, the coordinator 114 may enable a client device 102 to transmit a request to change the state of a coordinated device 112, and cause such a change in state to occur. As a further example, the coordinator 114 may enable a user to specify a criterion under which a state of a coordinated device 112 should be changed, and then automatically operate to change the state of the coordinated device 112 when the criterion is satisfied.

As will be discussed below, many functions of the coordinator 114 may be established via tasks, enabling rapid alteration of these functions as desired by a user. In some instances, such tasks (or dependencies of such tasks, such as libraries, drivers, etc.) may be provided by a user of the coordinator. In other instances, such tasks may be provided to the coordinator 114 by a service provide environment 120. For example, the service provider environment 150 may maintain a library of tasks available to coordinators 114, as well as types of coordinated devices 112 to which such tasks can apply (e.g., all devices, a specific device model, devices of a specific manufacturer, type, or function, etc.). The service provider environment 150 may then provide all or some tasks to a coordinator 114 appropriate for the coordinated devices 112 in a coordinated environment 110 of the coordinator 114, or notify a user of the availability of such tasks. In one embodiment, a user may notify the service provider environment 150 or the coordinator 114 as to the coordinated devices 112 in the coordinated environment 110. In another embodiment, the coordinator 114 may be configured to determine characteristics of coordinated devices 112 within a coordinated environment 110 based on transmissions of those devices. Illustratively, on receiving a communication from a coordinated device 112 (e.g., in response to a user-initiated pairing, based on automated transmissions, etc.), a coordinator 114 may compare a content or format of the transmission to information mapping formats or contents to different device times. Such a mapping may be maintained by the service provider environment 150, and updated based on data collected from various coordinators 114. In some instances, rather than mapping transmission to device types, a coordinator 114 may function to map transmissions to tasks appropriate for a device 112, regardless of whether the type of the device 112 is known. For example, the service provider environment 150 may collect, for an established environment 110 with one or more coordinated devices 112, data identifying a content or format of transmission of such devices 112 and the tasks utilized to manage operation of such devices 112. Thereafter, newly created coordinated environments 110 may be monitored for identical or similar transmissions, and the tasks utilize in the established environment 110 may be presented for potential use in the newly create environment 110. In still other embodiments, a coordinator 114 may utilize standardized discovery protocols, such as the Universal Plug and Play (UPnP) set of protocols, to discover devices 112 within a coordinated environment 110.

Client devices 102 may include a variety of computing devices enabling a user to communicate with the coordinated environments 110, the service provider environment 120, or both. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 120 may provide the client devices 102 with one or more user interfaces, command-line interfaces (CLI), application programing interfaces (API), and/or other programmatic interfaces for interacting with the service provider environment 120, such as to submit a configuration for a coordinator 114, and control deployment of that configuration, to submit code corresponding to a task to be executed on the coordinator 114 or an on-demand code execution environment 150 of the service provider environment 120, to view logging or monitoring information related to coordinators 114, etc. Similarly, the coordinator 114 may provide the client devices 102 with one or more user interfaces, command-line interfaces (CLI), application programing interfaces (API), or other programmatic interfaces for interacting with the coordinator 114, such as to read a state of a coordinated device 112, request a change in state of a coordinated device 112, request that the coordinator 114 cause execution of a task, etc. Although one or more embodiments may be described herein as using a user interface, it should be appreciated that such embodiments may, additionally or alternatively, use any CLIs, APIs, or other programmatic interfaces.

The service provider environment 120 can include a number of elements to enable configuration of, management of, and communications with coordinators 114. Specifically, the service provider environment 120 includes a management and deployment service 130 to enable registration of coordinators 114 with the service provider environment 120 and configuration of such coordinators 114, a device shadow service 140 to enable robust changes to state of coordinators 114 and coordinated devices 112, and an on-demand code execution environment 150 providing on-demand, dynamic execution of tasks, as well as deployment and provisioning of tasks on coordinators 114.

As shown in FIG. 1, the management and deployment service 130 includes a client and data interface 132 and a configuration data store 134 that may operate collectively to enable registration of a coordinator 114 with the management and deployment service 130, generation of configurations for the coordinator 114, and transmission of configuration data to the coordinator 114. Illustratively, the client and data interface 132 may provide one or more user interfaces (e.g., APIs, CLIs, GUIs, etc.) through which a user, via a client device 102, may generate or submit a configuration of a coordinator 114 for storage in the configuration data store 134. The client and data interface 132 may further provide one or more interfaces through which a coordinator 114 may obtain the configuration, such that the coordinator 114 is reconfigured according to the obtained configuration. The configuration data store 134 can correspond to any persistent or substantially persistent data store, such as a hard drive (HDD), a solid state drive (SDD), network attached storage (NAS), a tape drive, or any combination thereof.

The device shadow service 140 can include elements enabling a "shadow state" of a device, such as a coordinator 114 or a coordinated device 112, to be created, maintained, read, altered, or deleted. As discussed above, a shadow state may correspond to data representing a desired state of a correspond device, which may or may not mirror a current state of the device. For example, with respect to a coordinator 114, a shadow state may include a desired configuration version for the coordinator 114. With respect to a coordinated device 112, a shadow state may include a desired state of the coordinated device 112 (e.g., on or off for a switch or bulb, locked or unlocked for a lock, a desired temperature for a thermostat, etc.). The device shadow service 140 may enable users, via client devices 102, or other entities to read from or modify a shadow state for a device, and may further interact with that device to synchronize the device to the shadow state. Illustratively, the device shadow service 140 may include an interface 142 (which may include, e.g., APIs, CLIs, GUIs, etc.) through which requests to read from, write to, create or delete a shadow state may be received, as well as a shadow data store 144 configured to store the shadow states. The shadow data store 134 can correspond to any persistent or substantially persistent data store, such as a hard drive (HDD), a solid state drive (SDD), network attached storage (NAS), a tape drive, or any combination thereof. The device shadow service 140 may be optional and omitted from the service provider environment 120.

The on-demand code execution environment 150 can include a number of devices providing on-demand execution of tasks (e.g., portable code segments). Specifically, the on-demand code execution environment 150 can include a frontend 152, through which users, via client device 102, may submit tasks to the on-demand code execution environment 150 and call for execution of tasks on the on-demand code execution environment 150. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution system 150 can include a variety of additional components to enable execution of tasks, such as a number of execution environments (e.g., containers or virtual machines executing on physical host devices of the on-demand code execution environment 150), a worker manager to manage such execution environments, and a warming pool manager to assist in making execution environments available to the worker manager on a rapid basis (e.g., under 10 ms).

As noted above, tasks may be utilized both at the on-demand code execution environment 150 and at coordinators 114. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 150 or a coordinator 114 in a variety of manners. In one embodiment, a client device 102 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, an network-accessible storage service, or the task data store 154) prior to the request being received by the coordinator 114 or the on-demand code execution system 150. A request interface of the coordinator 114 or the on-demand code execution system 150 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to a coordinator 114 or the on-demand code execution system 150 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, or the computing resources (e.g., memory, etc.) to be reserved for executing the program code. For example, the program code of a task may be provided with the call, previously uploaded by the user, provided by the coordinator 114 or the on-demand code execution system 150 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 140 or the on-demand code execution system 150 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 114 or the on-demand code execution system 150 may inspect the call and look for the flag or the header, and if it is present, the coordinator 114 or the on-demand code execution system 150 may modify the behavior (e.g., logging facilities) of the execution environment in which the task is executed, and cause the output data to be provided back to the user. In some embodiments, the behavior/mode indicators are added to the call by the user interface provided to the user by the coordinator 114 or the on-demand code execution system 150. Other features such as source code profiling, remote debugging, etc., may also be enabled or disabled based on the indication provided in a call. Still further as discussed above, in certain embodiments, the call may specify a file location and expected inputs/outputs from the file location that correspond to access of resources local to specific coordinated devices 112 that will execute the task.

The service provider environment 120 is depicted in FIG. 1 as operating in a distributed computing environment including several computer systems that are interconnected using one or more computer networks (not shown in FIG. 1). The service provider environment 120 could also operate within a computing environment having a fewer or greater number of devices than are illustrated in FIG. 1. Thus, the depiction of the service provider environment 120 in FIG. 1 should be taken as illustrative and not limiting to the present disclosure. For example, the service provider environment 120 or various constituents thereof could implement various Web services components, hosted, or "cloud" computing environments, and/or peer to peer network configurations to implement at least a portion of the processes described herein.

Further, the service provider environment 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
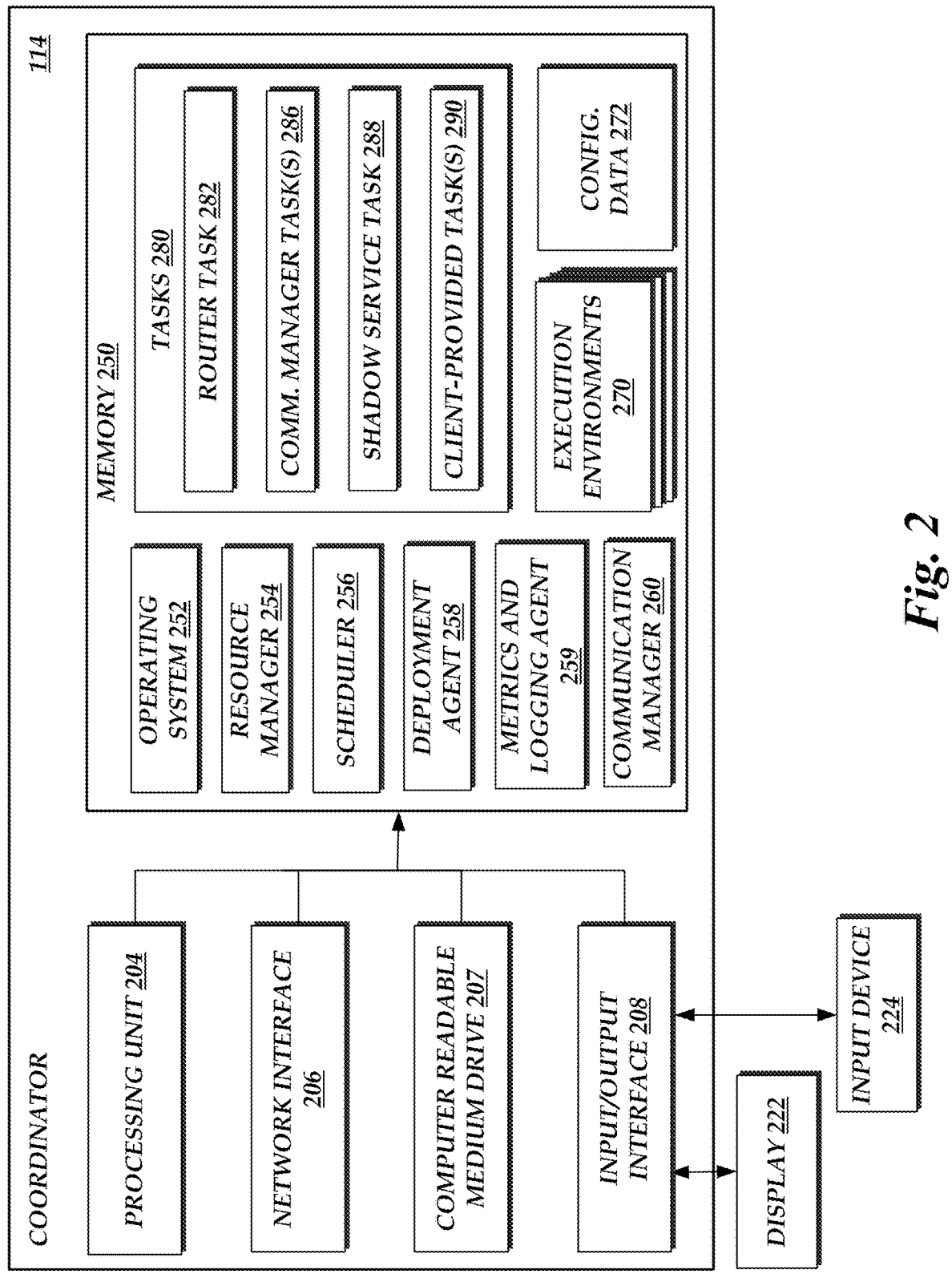
FIG. 2 depicts a general architecture of a computing device providing a coordinator of FIG. 1.

FIG. 2 depicts a general architecture of a computing system (referenced as coordinator 114) that manages coordinated devices 112 within a given coordinated environment 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The coordinator 114 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the coordinator 114 includes a processing unit 204, a network interface 206, a computer readable medium drive 207, and an input/output device interface 208, all of which may communicate with one another by way of a communication bus. The network interface 206 may provide connectivity to one or more networks or computing systems. The processing unit 204 may thus receive information and instructions from other computing systems or services via the network 104. The processing unit 204 may also communicate to and from memory 250 and further provide output information for additional resources via the input/output device interface 208. The input/output device interface 208 may also accept input from the additional resources.

The memory 250 may contain computer program instructions (grouped as modules in some embodiments) that the processing unit 204 executes in order to implement one or more aspects of the present disclosure. The memory 250 generally includes random access memory (RAM), read only memory (ROM) and/or other persistent, auxiliary, or non-transitory computer readable media. The memory 250 may store an operating system 252 that provides computer program instructions for use by the processing unit 204 in the general administration and operation of the coordinator 114. The memory 250 may further include computer program instructions and other information for implementing aspects of the present disclosure. For example, in one embodiment, the memory 250 includes a process manager 254, a scheduler 256, a deployment agent 258, and a communication manager 260.

The scheduler 256 and deployment agent 258 may be executed by the processing unit 204 to select tasks for execution by the processing unit 204, and to manage such task executions. Specifically, the scheduler 256 may include instructions to select a tasks for execution at given points in time and to suspend execution of tasks (e.g., under instances of constrained resources at the coordinator 114). The deployment agent 258 may include instructions to select an appropriate execution environment 270 in which to execute a task, to provision that execution environment 270 with appropriate access to resources needed during the task execution, and to cause execution of the task within the execution environment 270. An execution environment 270, as used herein, refers to a logical portion of memory 250 in which to execute a task. In one embodiment, execution environments 270 are programmatically separated, such that execution of code in a first execution environment 270 is prohibited from modifying memory associated with another execution environment 270. Illustratively, an execution environment 270 may correspond to a "container," operating-system-level virtualization environment, or "sand box" environment, such as a "chroot jail" or a Python virtual environment "virtualenv." In other instances, an execution environment 270 may correspond to a virtual machine environment (e.g., a JAVA virtual machine, a virtualized hardware device with distinct operating system, etc.). In still other instances, an execution environment 270 may be a memory space allocated to an execution of a task, without necessarily utilizing virtualization.

Communications between tasks executing on the coordinator, as well as between the coordinator 114 and other devices (e.g., client devices 102 and coordinated devices 112) may be facilitated by the communication manager 260. Specifically, the communication manager 260 may be configured to obtain messages directed to the coordinator 114 and forward the message to the appropriate destination. For example, the communication manager 260 may route messages between any combination of tasks, coordinated devices 112, client devices 102, and devices of the service provider execution environment 120.

To enable gathering of information regarding operation of the coordinator 114, the memory 250 further includes a metrics and logging agent 259, corresponding to code executable by the coordinator 114 to monitor operation of the coordinator 114, such as how tasks are executed at the coordinator 114, and to report information regarding such operation. The information may include, for example, execution times of tasks on the coordinator 114, as well as information regarding such executions (e.g., compute resources used, whether the execution resulted in an error, etc.). In some instances, the metrics and logging agent 259 may store this information locally, such as in the memory 250, to enable a user to obtain the information. In other instances, the metrics and logging agent 259 agent may store the information remotely, such as at the service provider environment 150. The metrics and logging agent 259 may also implement additional functionality with respect to monitoring operation of the coordinator 114, such as transmitting health check data from the coordinator 114 to the service provider environment 150.

Tasks executed by the coordinator 114 are shown as logically grouped within the tasks memory space 280, which may correspond to a logical unit of memory 250 configured to store the code corresponding to each task. As shown in FIG. 2, the tasks memory space 280 can include a number of tasks executable by the processing unit 204 to implement functionalities of the coordinator 114, including a router task 282, one or more communication manager tasks 286, a shadow service task 288, and one or more client-provided tasks 290.

The router task 282 may correspond to a portion of code executable to assist in the routing of messages within, to, and from the coordinator 114. In one embodiment, the router task 282 implements an "event flow table" to determine appropriate destinations for a message or other indications of events received at the coordinator 114. For example, the communication manager 260 may forward messages obtained at the coordinator 114 (e.g., due to generation by a task execution or reception at the input/output interface 208) to the router task 282, which may utilize the event flow table to determine that messages addressed to a certain identifier should be routed to a given task, a given client device 102, or a given coordinated device 102. In some instances, the event flow table may further be utilized to specify a manner of handling messages of a give type. For example, the event flow table may specify that messages or event data originating at a certain task or coordinated device 112 should be transmitted to another task or coordinated device 112, logged at the coordinator 114, disallowed, result in a new execution of a task, etc. The event flow table may further indicate that a message meeting specified criteria (e.g., addressed to a given identifier, including a specific flag, etc.) should be transmitted to the service provider environment 120 (e.g., to the device shadow service 140 or the on-demand code execution system 150). In one embodiment, the event flow table may utilize "topics" as identifiers, such that messages associated with a particular topic are transmitted according to a routing specified for that topic. The event flow table may further include information for how to route messages based on a source of those messages. For example, a message addressed to a given topic may be routed differently, based on whether the message is received from a first task, a second task, a first coordinated device 112, etc. By utilization of an event flow table, router task 282 can enable messages to be handled in different manners, without a change in the operation of a sender of such a message (e.g., without rewriting code for a task that generated the message, without modifying the software of a coordinated device 112 that generated the message, etc.).

The communication manager tasks 286 may enable communications between the coordinator 114 and a number of different external devices (e.g., coordinated devices 102) according to a protocol of such communications. For example, a first communication manager task 286 may be configured to manage communications using a BLUETOOTH™ protocol, a second communication manager may be configured to manage communications using an HTTP protocol, etc. In some instances, multiple communication manager tasks 286 may work collectively to implement communications. For example, a first communication manager task 286 may enable communications via the TCP protocol, while a second communication manager task 286 may enable communications via the MQTT protocol (which utilizes the TCP protocol and thus may utilize the first communication manager task 286). Because different communication manager tasks 286 can vary the ability of the coordinator 114 to communicate via different protocols, and because the tasks of the coordinator 114 may be altered via reconfiguration of the coordinator 114, the coordinator 114 can be rapidly reconfigured to utilize a variety of different communication protocols.

The shadow service task 288 can facilitate management and interaction with device shadows maintained at the coordinator 114. Illustratively, the shadow service task 288 can implement functionality similar to that provided by the device shadow service 140 locally to the coordinator 114. Accordingly, the shadow service task 288 can maintain a shadow state (data representing a desired state) of a coordinated device 112, and allow for reading to or writing to such data. The shadow service task 288 can further enable synchronization of a coordinated device 112 with the device shadow for that device. Accordingly, by modifying a device shadow for a coordinated device 112, the state of the coordinated device 112 can be altered. By reading the device shadow for the coordinated device 112, the state of the coordinated device 112 can be determined. In some instances, the shadow service task 288 may further coordinate with another device shadow for a given device, such as a device shadow maintained by the device shadow service 140. For example, the shadow service task 288 may synchronize a local device shadow with a device shadow stored at the device shadow service 140, resolve conflicts between the local device shadow and the device shadow stored at the device shadow service 140, etc.

In addition to the tasks described above (each of which may illustratively be provided by an entity associated with the service provider environment 120), the tasks memory space 280 may include any number of client-provided tasks 290, which may correspond to executable code generated by a client device 102 and submitted to the service provider environment 120 for deployment to a coordinator 114. As such, functionalities provided by the client-provided tasks 290 may vary according to the desires of a submitting user. In some instances, the client-provided tasks 290 may be written in a coding language for which the memory 250 includes a language runtime. For example, where the coordinator 114 supports language such as node.js, Go, JAVA, and Python, the client-provided tasks 290 may include executable code written in any of those languages.

In addition, the memory 250 includes a configuration data portion 272, representing a logical portion of the memory 250 in which configuration data of the coordinator 114 is stored. The configuration data may include, for example, a current deployment version of the coordinator 114, data stored by the tasks of the task memory space 280, or other data used in the operation of the coordinator 114.

To enable configuration (and reconfiguration) of the coordinator 114, the memory 250 further includes a deployment agent 258. The deployment agent 258 can correspond to code executable to register a coordinator with the service provider environment 120, to determine a desired configuration of the coordinator 114, and in instances where a current configuration of the coordinator 114 does not match a desired configuration, to obtain configuration data for the coordinator 114 and modify the memory 250 to implement the desired configuration.

Figure 3A:
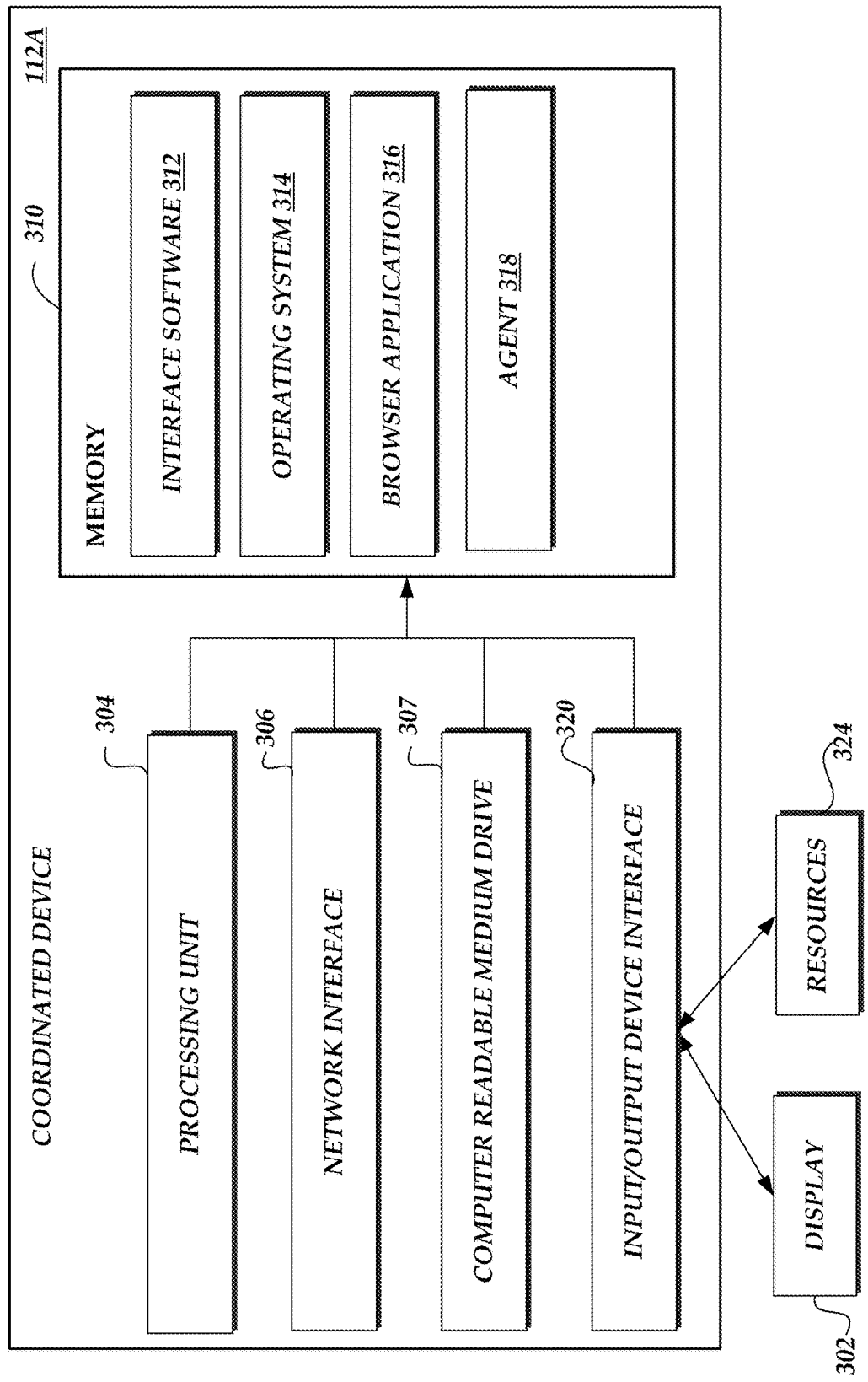

FIG. 3A depicts one embodiment of an architecture of an illustrative coordinated device 112A in accordance with the present application. The general architecture of the coordinated device 112A depicted in FIG. 3A includes an arrangement of computer hardware and software components that may be used to implement aspects of the present disclosure.

As illustrated, the coordinated device 112A includes a processing unit 304, a network interface 306, a computer readable medium drive 307, an input/output device interface 320, an optional display 302, and an input device 324, all of which may communicate with one another by way of a communication bus. Illustratively, the coordinated device 112A may have more limited functionality and components, such as inputs or outputs, as embedded devices. Still further, in some embodiments, a computing device may implement the functionality associated with the coordinator 114 and coordinated device 112.

The network interface 306 may provide connectivity to one or more networks or computing systems, such as the network 104 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from local resources 324, such as a specialized processor (e.g., graphics processing units), memory, optimized chipsets, etc. In some embodiments, the coordinated device 112A may include more (or fewer) components than those shown in FIG. 3A. For example, some embodiments of the coordinated device 112 may omit the display 302 and input device 324, while providing input/output capabilities through one or more alternative communication channel (e.g., via the network interface 306).

The memory 310 may include computer program instructions that the processing unit 204 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the coordinated device 112A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be an interface software application (or executable instructions) that provide for data connectivity. In some embodiments, the memory 310 can further include an agent software application 318 for establishing a communication channel with the service provider environment 310 to facilitate interaction with the local resources 324. The agent software application 318 may be implemented in combination with the browser software application 316, in lieu of the browser software application 316 or separately. In some testing environments, as discussed above, the agent software application 318 may be omitted.

FIG. 3B depicts one embodiment of an alternative architecture of an illustrative coordinated device 112B in accordance with the present application. The general architecture of the coordinated device 112B depicted in FIG. 3B includes an arrangement of computer hardware and software components that may be used to implement aspects of the present disclosure. However, coordinated device 112B may be associated with a reduced of components that may limit the computing functionality and operation of the coordinated device 112B. As illustrated, the coordinated device 112B includes a processing unit 350 and a network interface 352 that communicate with a communication bus. Unlike coordinated device 112B of FIG. 3A, the coordinated device 112B may not have a computer readable medium drive, an optional display, or an input device. However, for purposes of the present application, the coordinated device 112B will likely have some local resource that can be accessed during the execution of a task.

The network interface 352 may provide connectivity to one or more networks or computing systems, such as the network 104 of FIG. 1. The processing unit 350 may thus receive information and instructions from other computing systems or services via a network. The memory 354 may include computer program instructions that the processing unit 350 executes in order to implement one or more embodiments. The memory 354 generally includes RAM, ROM, or other persistent or non-transitory memory. In this embodiment, the memory 354 may store necessarily store a full operating system that provides computer program instructions for use by the processing unit 350 in the general administration and operation of the coordinated device 112B. Rather, in one embodiment, the memory 354 includes an interface software component 356 for accessing receiving and processing instructions. In some embodiments, the memory 310 can further include an agent software application 358 for establishing a communication channel with the service provider environment 310 to facilitate interaction with the local resources 324. The agent software application 358 may be implemented in combination with the interface software application 356, in lieu of the browser software application 316 or separately. In some testing environments, as discussed above, the agent software application 318 may be omitted.

Figure 4:
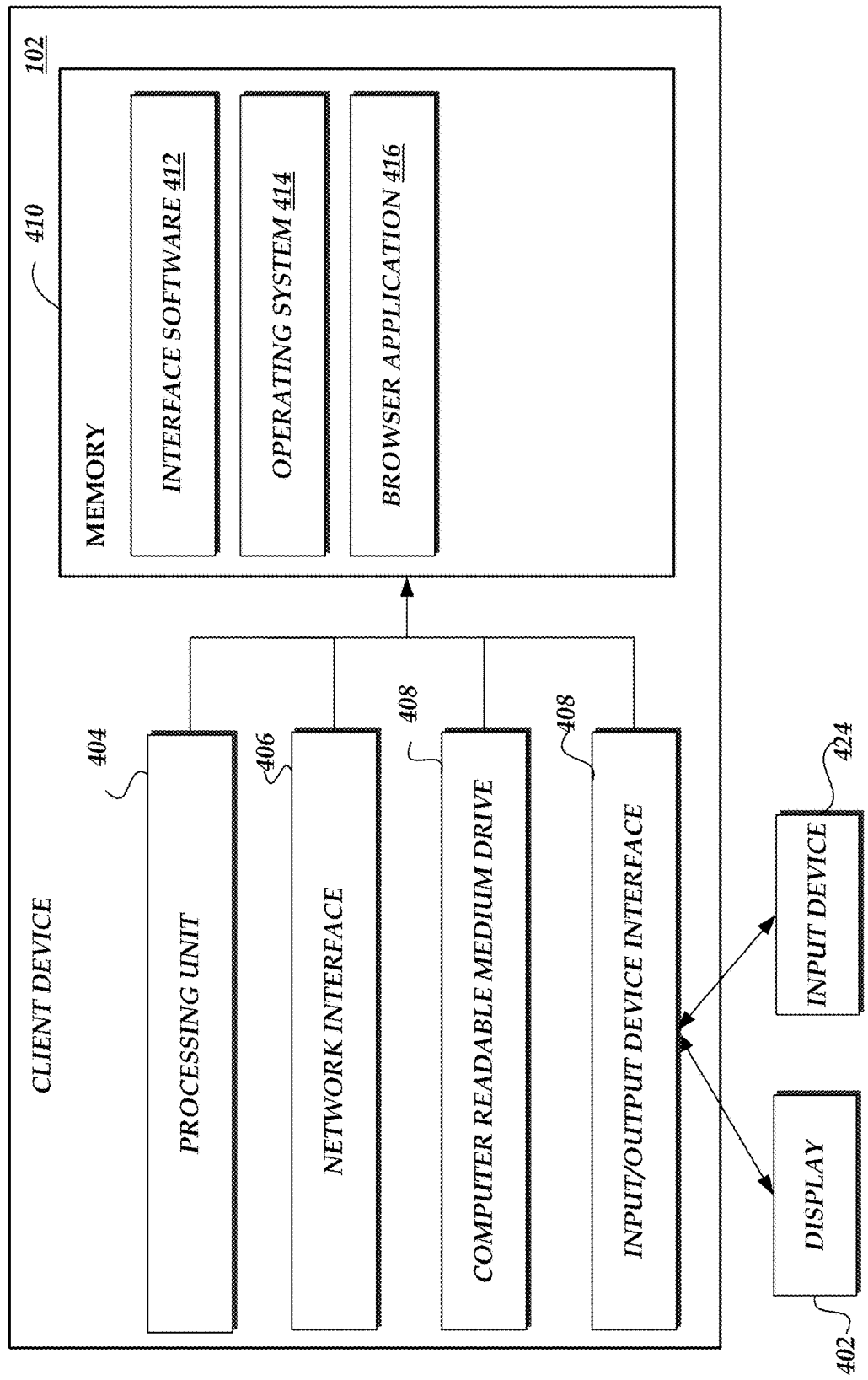
FIG. 4 depicts a general architecture of client device that may be utilized to generate and submit configuration information for a coordinator of FIG. 1.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/output device interface 420, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client device 102 may include more (or fewer) components than those shown in FIG. 4. For example, some embodiments of the coordinated device 112 may omit the display 402 and input device 424, while providing input/output capabilities through one or more alternative communication channel (e.g., via the network interface 406). Additionally, the client device 102 may omit the input and output interface 420 altogether as well.

The memory 410 may include computer program instructions that the processing unit 204 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 for accessing content. Illustratively, the browser application 416 may encompass a full software browser application, portions of a browser application or simply be a software application (or executable instructions) that provide for data connectivity.

Figure 5:
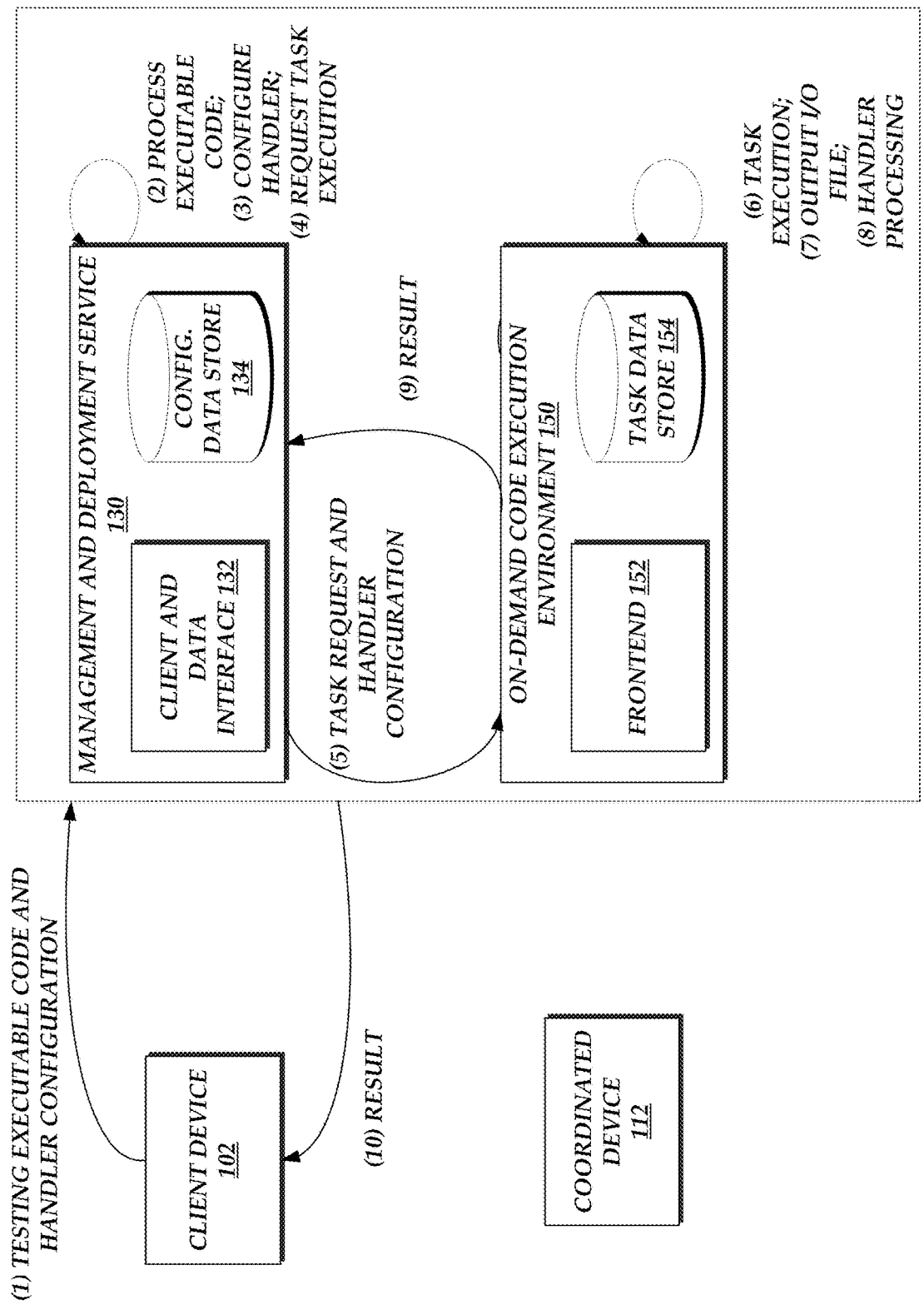
FIG. 5 is a block diagram of the environment of FIG. 1 illustrating an embodiment for testing executable code.

With reference to FIG. 5, illustrative interactions are depicted for testing of executable code to be implemented on a coordinated device 112 will be described. The interactions of FIG. 5 begin at (1), a client computing device 102 generates or obtains executable code to be executed by a coordinate device 112. Illustratively, interaction (1) may be implemented as part of an executable code generation interaction between a user associated with the client device 102 and the service provider environment 120. Although not illustrated in FIG. 5, the interaction can include various additional steps and exchanges including, but not limited to authentication and validation prior to allowing the submission of executable code to the service provider environment 120.

Additionally, in this embodiment, the client computing device 102 transmits handler configuration or provides information to allow access to the handler function configuration. As described above, illustratively a handler function is implemented by the on-demand code execution environment (or other service) for purposes of processing an intercepted I/O file generated by the execution of a task. The handler function defines the inputs anticipated to be generated from the task at execution and the outputs that would be generated by the resource corresponding to the handler function. The handler function may be configured as a file that specifies specific outputs for types of inputs. The handler function can also include additional rules or executable code that can be evaluated based on various inputs. The configuration information may be stored by the service provider environment 120 and utilized in multiple testing environments to eliminate the need for the client computing device 102 to transmit the handler configuration information each time.

At (2), the management and deployment service 130 processes the executable code. As described above, the management and deployment service 130 can utilize various meta-data or other information to generate one or more tasks to be executed by the coordinated device 112 or on-demand code execution environment 150. At (3), the management and deployment service 130 configures the handler function based on the configuration information provided by the client device 102 or provided on behalf of the client device.

At (4), the management and deployment service 130 requests task execution by selecting or requesting the selection of an instance to execute the task. At (5), the management and deployment service 130 transmits the request and handler configuration to the on-demand code execution environment 150. Illustratively, the interaction between the management and deployment service 130 and the on-demand code execution environment 150 can include various interactions to determine the appropriate instance that will emulate the execution of the task by a designated coordinated device 112.

At (6), the on-demand code execution environment 150 causes the execution of the task. As described above, in an illustrative embodiment, the execution of tasks that access local resources includes the generation of I/O files by the coordinated device 112 or on-demand execution service. At (7), the selected instance generates the I/O files in a manner similar to the way the coordinated device 112 would attempt to write to the local resource.

At (8), the on-demand code execution environment 150 intercepts the write attempt by the instances and invokes the handler function. Illustratively, the handler function obtains the inputs generated by the task execution and provides the expected outputs that would be generated by the locally access resource. At (9), the on-demand code execution environment 150 generates a result of the processing of the handler function outputs via the executing task. At (10), the management and deployment service 130 transmits the results to the client computing device 102 for further processing and debugging of the executable code. By specifying the known outputs of the handler function, the service provider environment 120 can emulate the interaction with local resources available to a coordinated device 112 to facilitate improved testing and the efficiency of repeated versions of the executable code. In other embodiments, the coordinator 114 may also implement the functionality illustrated in FIG. 5 and can be considered to be the coordinator 112 as illustrated.

Figure 6A:
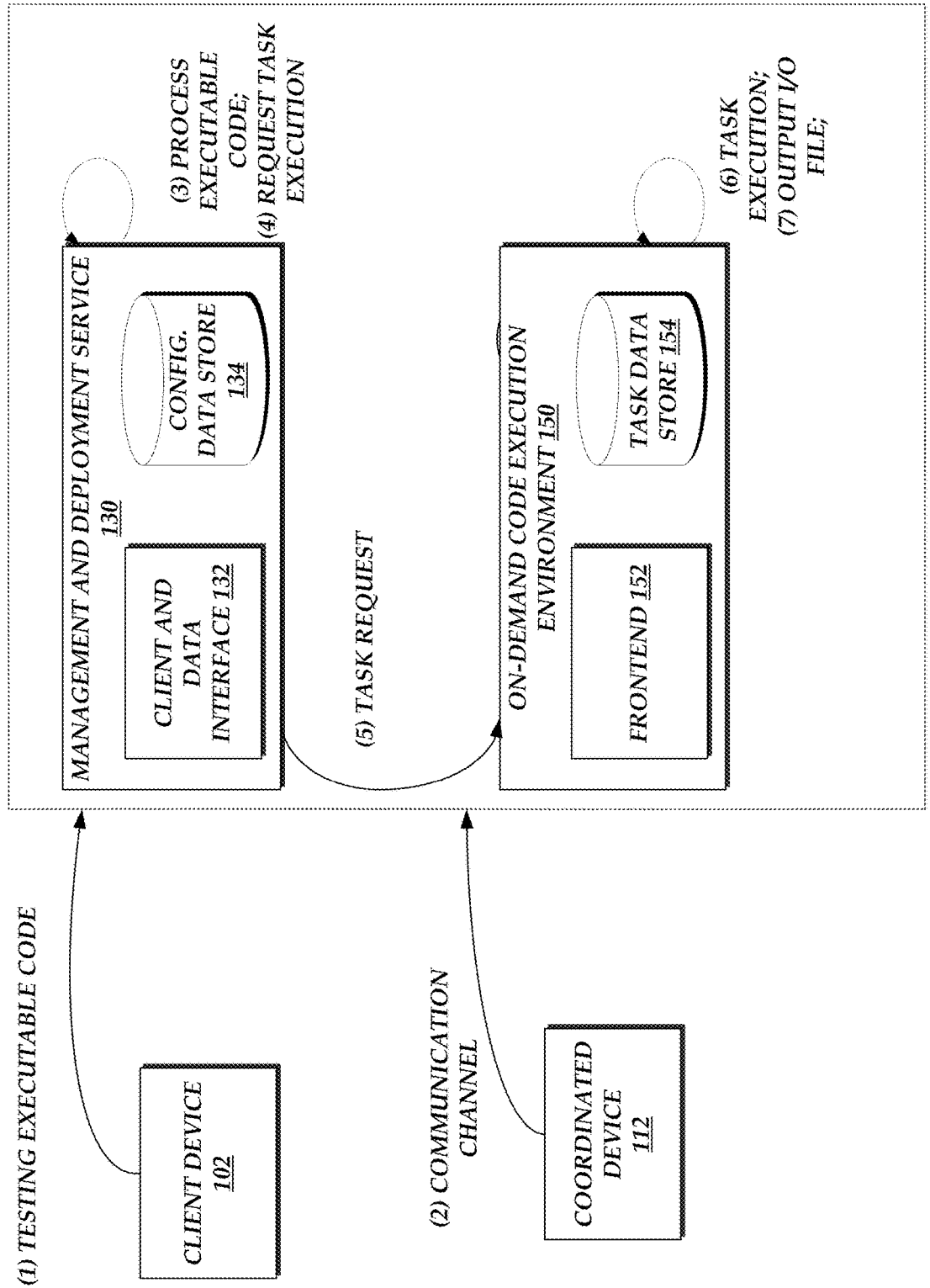
FIGS. 6A and 6B are block diagrams of the environment of FIG. 1 illustrating an embodiment for testing executable code.
Figure 6B:
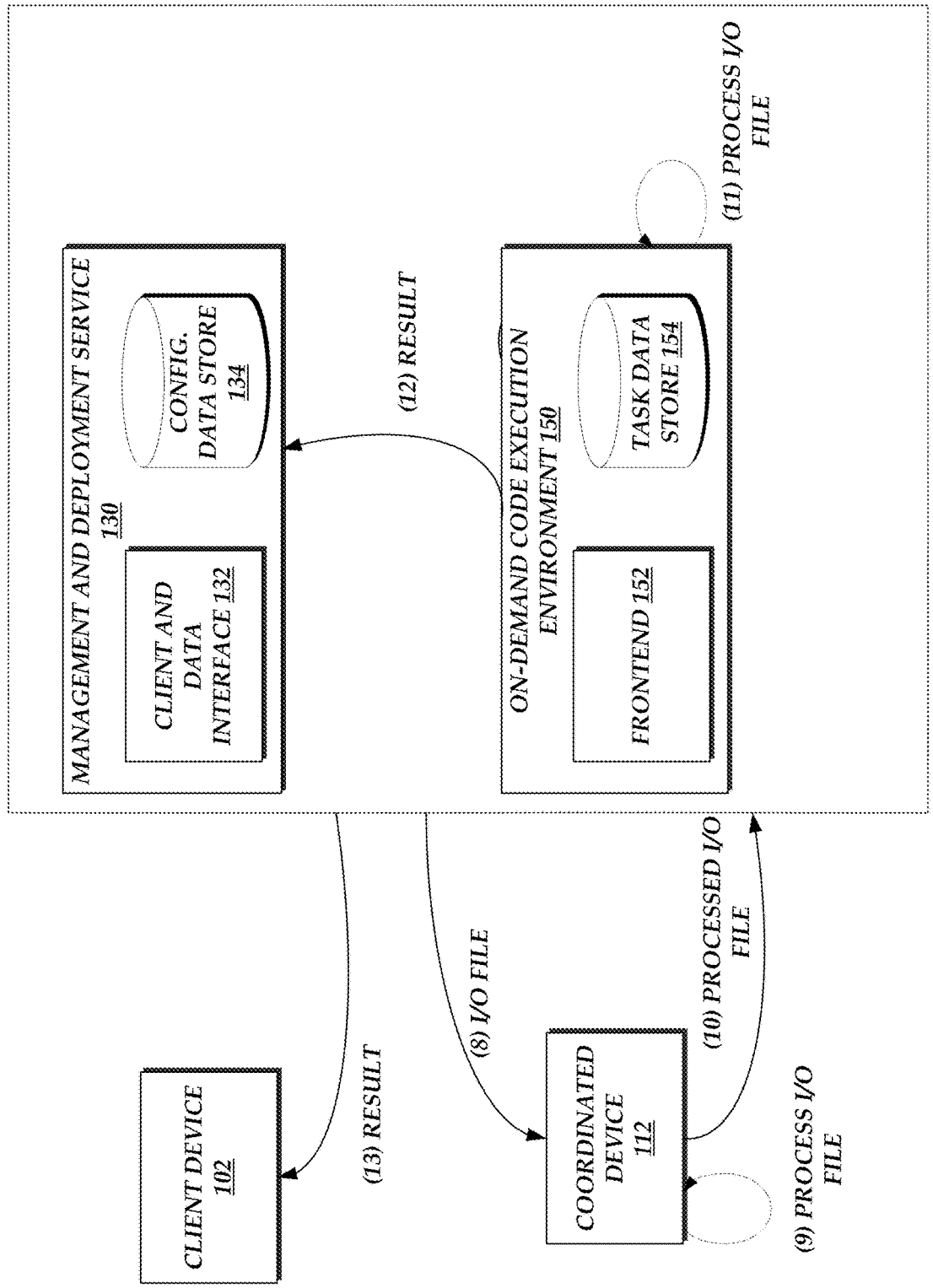

With reference to FIGS. 6A and 6B, illustrative interactions are depicted for testing of executable code to be implemented on a coordinated device 112 will be described. With reference to FIG. 6A at (1), a client computing device 102 generates or obtains executable code to be executed by a coordinate device 112. Illustratively, interaction (1) may be implemented as part of an executable code generation interaction between a user associated with the client device 102 and the service provider environment 120. Although not illustrated in FIG. 6A, the interaction can include various additional steps and exchanges including, but not limited to authentication and validation prior to allowing the submission of executable code to the service provider environment 120. In this embodiment, the client computing device 102 does not generate the handler function configuration information.

At (2), the service provider environment 120 establishes a communication channel with the coordinated device 112 that will be providing the local resources. Illustratively, in this embodiment, the handler function may be not possible to be configured because the outputs generated by the resource may not be known or may be too complex to configure.

At (3), the management and deployment service 130 processes the executable code. As described above, the management and deployment service 130 can utilize various meta-data or other information to generate one or more tasks to be executed by the coordinated device 112 or on-demand code execution environment 150.

At (4), the management and deployment service 130 requests task execution by selecting or requesting the selection of an instance to execute the task. At (5), the management and deployment service 130 transmits the request to the on-demand code execution environment 150. Illustratively, the interaction between the management and deployment service 130 and the on-demand code execution environment 150 can include various interactions to determine the appropriate instance that will emulate the execution of the task by a designated coordinated device 112.

At (6), the on-demand code execution environment 150 causes the execution of the task. As described above, in an illustrative embodiment, the execution of tasks that access local resources includes the generation of I/O files by the coordinated device 112 or on-demand execution service. At (7), the selected instance generates the I/O files in a manner similar to the way the coordinated device 112 would attempt to write to the local resource.

With reference to FIG. 6B, at (8), the on-demand code execution environment 150 intercepts the write attempt by the instances and invokes the transmission function to the agent on the coordinated device 112 via the established communication channel. Illustratively, the agent can cause the I/O file to be written to the designated location on the coordinated device. At (9), the coordinated device 112 processes the I/O that is written and generates a resulting processing I/O file at (10).

At (11), the on-demand code execution environment 150 processes the I/O file returned from the coordinated device 112 and transmits a result of the processing of the handler function outputs via the executing task at (12). At (13), the management and deployment service 130 transmits the results to the client computing device 102 for further processing and debugging of the executable code. By interacting with the coordinated device, the service provider environment 120 can emulate the execution of the tasks and preserve the interaction with local resources available to a coordinated device 112 to facilitate improved testing and the efficiency of repeated versions of the executable code.

Figure 7:
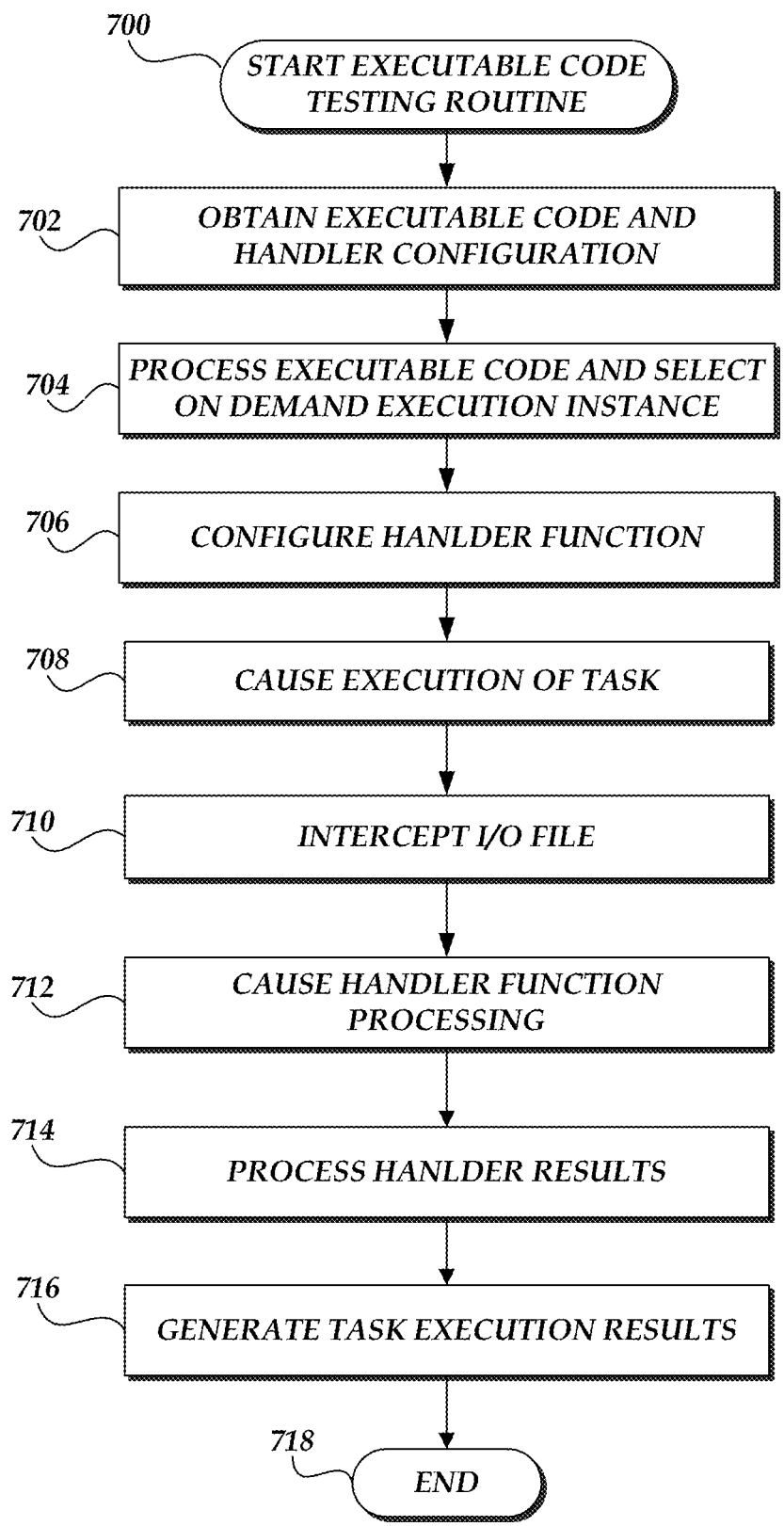
FIG. 7 is a flow diagram depicting illustrative interactions for modifying a configuration of a coordinated device via a client device via a coordinator, without requiring communications external to a coordinated environment.

Turning now to FIG. 7, an illustrative routine 700 for implementing a testing framework will be described. Illustratively, routine 700 will be described with regard to implementation by one or more components of the service provider environment 120 with regard to a coordinate device 112. As previously described, in some embodiments, one or more aspects of the coordinated device 112 may be implemented by a computing device that also implements functionality associated with the coordinator 114. At block 702, the service provider environment 120 obtains executable code to be executed by a coordinate device 112 from a client computing device 102. Illustratively, interaction between the service provider environment 120 and the client computing device 102 may be implemented as part of an executable code generation interaction between a user associated with the client device 102 and the service provider environment 120. Such interaction can include various additional steps and exchanges including, but not limited to authentication and validation prior to allowing the submission of executable code to the service provider environment 120.

As previously described, in routine 700, the client computing device 102 transmits handler configuration or provides information to allow access to the handler function configuration. As described above, illustratively a handler function is implemented by the on-demand code execution environment (or other service) for purposes of processing an intercepted I/O file generated by the execution of a task. The handler function defines the inputs anticipated to be generated from the task at execution and the outputs that would be generated by the resource corresponding to the handler function. The handler function may be configured as a file that specifies specific outputs for types of inputs. The handler function can also include additional rules or executable code that can be evaluated based on various inputs. The configuration information may be stored by the service provider environment 120 and utilized in multiple testing environments to eliminate the need for the client computing device 102 to transmit the handler configuration information each time.

At block 704, the management and deployment service 130 of the service provider environment 120 processes the executable code. As described above, the management and deployment service 130 can utilize various meta-data or other information to generate one or more tasks to be executed by the coordinated device 112 or on-demand code execution environment 150. At block 706, the management and deployment service 130 configures the handler function based on the configuration information provided by the client device 102 or provided on behalf of the client device.

At block 708, the management and deployment service 130 requests task execution by selecting or requesting the selection of an instance to execute the task. For example, the management and deployment service 130 transmits the request and handler configuration to the on-demand code execution environment 150. Illustratively, the interaction between the management and deployment service 130 and the on-demand code execution environment 150 can include various interactions to determine the appropriate instance that will emulate the execution of the task by a designated coordinated device 112. Included in block 708, the on-demand code execution environment 150 causes the execution of the task. As described above, in an illustrative embodiment, the execution of tasks that access local resources includes the generation of I/O files by the coordinated device 112 or on-demand execution service. As described above, the selected instance generates the I/O files in a manner similar to the way the coordinated device 112 would attempt to write to the local resource.

At block 710, the on-demand code execution environment 150 intercepts the write attempt by the instances. In this embodiment, the interception of the I/O file write command also includes the invocation of the handler function. As will be described below, in other embodiment, the interception of the I/O file write command can invoke a different reaction as well. In this embodiment, the handler function obtains the inputs generated by the task execution and provides the expected outputs that would be generated by the locally access resource. At block 714, the on-demand code execution environment 150 generates a result of the processing of the handler function outputs via the executing task. At block 716, the management and deployment service 130 transmits the results to the client computing device 102 for further processing and debugging of the executable code. By specifying the known outputs of the handler function, the service provider environment 120 can emulate the interaction with local resources available to a coordinated device 112 to facilitate improved testing and the efficiency of repeated versions of the executable code.

Figure 8:
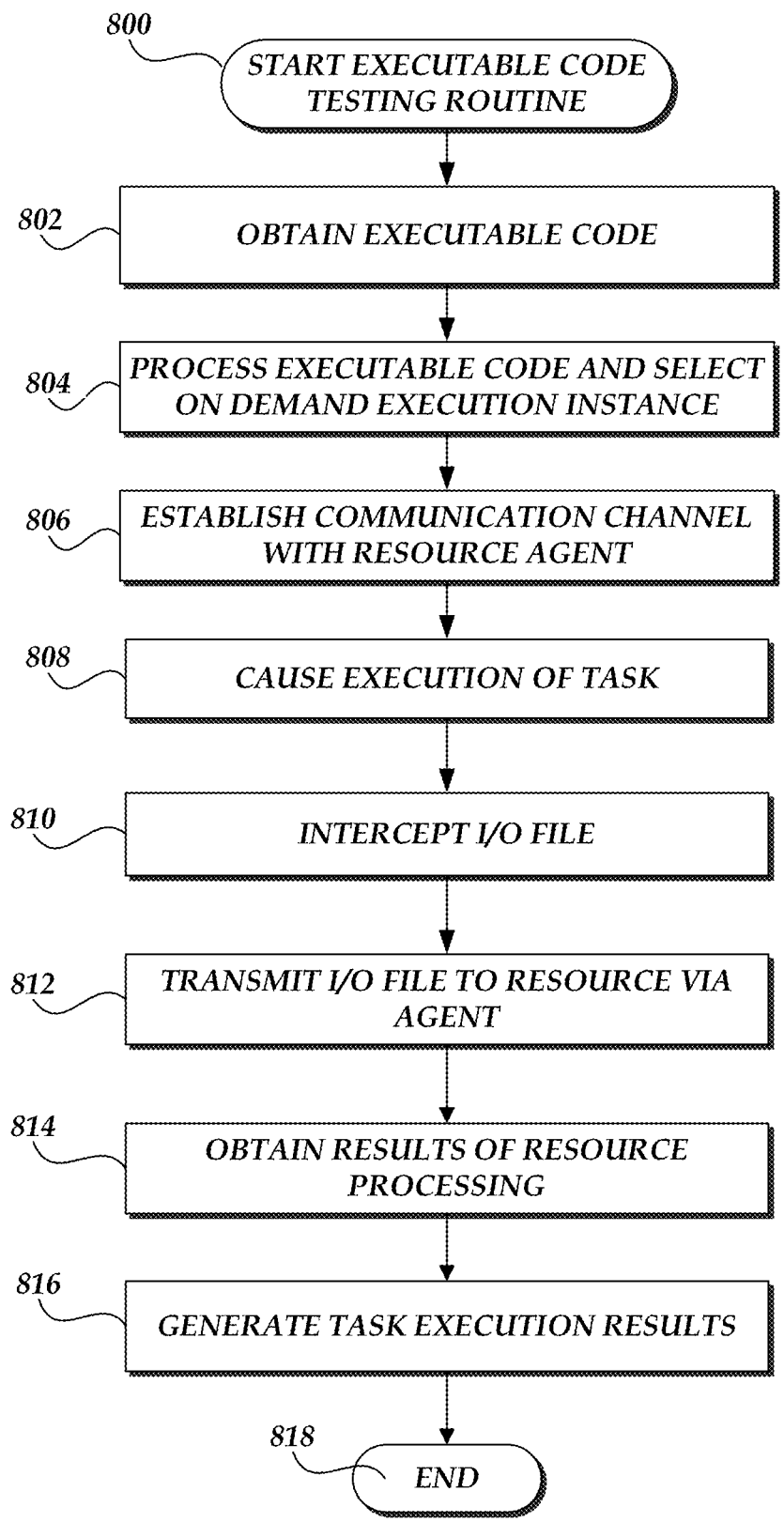
FIG. 8 is a flow diagram depicting illustrative interactions for managing a queue of work items, such as calls to execute a task, on a coordinator of FIG. 1.

Turning now to FIG. 8, an illustrative routine 800 for implementing an alternative testing framework will be described. Illustratively, routine 800 will also be described with regard to implementation by one or more components of the service provider environment 120 with regard to a coordinate device 112. As previously described, in some embodiments, one or more aspects of the coordinated device 112 may be implemented by a computing device that also implements functionality associated with the coordinator 114. At block 802, the service provider environment 120 obtains executable code to be executed by a coordinate device 112 from a client computing device 102. Illustratively, interaction between the service provider environment 120 and the client computing device 102 may be implemented as part of an executable code generation interaction between a user associated with the client device 102 and the service provider environment 120. Illustratively, the interaction can include various additional steps and exchanges including, but not limited to authentication and validation prior to allowing the submission of executable code to the service provider environment 120. In this embodiment, the client computing device 102 does not generate the handler function configuration information.

At block 804, the service provider environment 120 establishes a communication channel with the coordinated device 112 that will be providing the local resources. Illustratively, in this embodiment, the handler function may be not possible to be configured because the outputs generated by the resource may not be known or may be too complex to configure.

At block 806, the management and deployment service 130 processes the executable code. As described above, the management and deployment service 130 can utilize various meta-data or other information to generate one or more tasks to be executed by the coordinated device 112 or on-demand code execution environment 150.

At block 808, the management and deployment service 130 requests task execution by selecting or requesting the selection of an instance to execute the task. Block 808 includes the management and deployment service 130 transmits the request to the on-demand code execution environment 150. Illustratively, the interaction between the management and deployment service 130 and the on-demand code execution environment 150 can include various interactions to determine the appropriate instance that will emulate the execution of the task by a designated coordinated device 112. Additionally, the on-demand code execution environment 150 causes the execution of the task. As described above, in an illustrative embodiment, the execution of tasks that access local resources includes the generation of I/O files by the coordinated device 112 or on-demand execution service. Illustratively, the selected instance generates the I/O files in a manner similar to the way the coordinated device 112 would attempt to write to the local resource.

At block 810, the on-demand code execution environment 150 intercepts the write attempt by the instances and invokes the transmission function to the agent on the coordinated device 112 via the established communication channel Illustratively, the agent can cause the I/O file to be written to the designated location on the coordinated device. At block 812, the coordinated device 112 processes the I/O that is written and generates a resulting processing I/O file At block 812, the on-demand code execution environment 150 processes the I/O file returned from the coordinated device 112 and transmits a result of the processing of the handler function outputs via the executing task. The management and deployment service 130 transmits the results to the client computing device 102 for further processing and debugging of the executable code. By interacting with the coordinated device, the service provider environment 120 can emulate the execution of the tasks and preserve the interaction with local resources available to a coordinated device 112 to facilitate improved testing and the efficiency of repeated versions of the executable code.

While various functionalities may be described above independently, it is contemplated that these functionalities may be implemented both independently or in any combination. For example, a coordinator computing device as described herein may enable interpretation of received messages (e.g., MQTT messages from coordinated devices) to determine a subset of devices or tasks that the messages should be forward to, potentially by use of specialized message topics. As a further example, a coordinator computing device may further utilize security information included within received messages (e.g., from coordinated devices or task executions) to determine whether messages should be forwarded between recipients. As yet another example, a coordinator computing device may enable the use of embedded codes within messages (e.g., within a topic field) to enable variable handling of messages, potentially without requiring inspection of a message body. One of skill in the art will appreciate, in light of the present disclosure, that many combinations of the functionalities described herein are possible.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to process, by a virtualized environment instantiated on an on-demand network, executable code to be transmitted to coordinated devices in a local environment remote from the on-demand network, the system comprising:
- a deployment device in communication with one or more coordinated devices, the deployment device comprising a processor configured with computer-executable instructions to:
  - obtain executable code generated by a client device, the executable code resulting in one or more tasks to be executed by a coordinated device configured to execute on-demand tasks in accordance with a virtualized environment hosted on the coordinated device, wherein the coordinated device configured to execute the on-demand tasks includes at least one accessible physical computing resource, and wherein executing the on-demand tasks by the coordinated device includes executing at least a portion of the on-demand tasks to access the at least one accessible physical computing resource;
  - cause execution of the one or more tasks by the virtualized environment instantiated on the on-demand network, wherein execution of the one or more tasks results in generation of an input/output file configured to access the at least one accessible physical computing resource by attempting to write the input/output file to a designated file location local to the instance of the on-demand network;
  - in response to the execution of the one or more tasks, intercept the attempted writing of the input/output file by the virtualized environment instantiated on the on-demand network;
  - transmit the intercepted input/output file to the coordinated device in the local environment, wherein the transmitting causes the at least one accessible computing resource to process the input/output file in the local environment without executing the one or more tasks and to generate a processed input/output file;
  - receive, from the at least one accessible computing resource, the processed input/output file generated at the at least one accessible computing resource based on processing the intercepted input/output file at least in part on the at least one accessible physical computing resource; and
  - generate processing results of the execution of the one or more tasks based on the processed input/output file.

2. The system of claim 1, wherein the processor is further configured with computer-executable instructions to obtain a configuration of a handler function, wherein the configuration of the handler function includes an identification of inputs and outputs corresponding to the at least one accessible physical computing resource.

3. The system of claim 1, wherein the processor is further configured with computer-executable instructions to establish a communication channel with an agent on the coordinated device configured to execute on-demand tasks, the agent receiving the transmitted input/output file.

4. The system of claim 1, wherein the processor is further configured with computer-executable instructions to transmit the processing results.

5. The system of claim 1, wherein the at least one accessible physical computing resource comprises an embedded device within a household appliance.

6. A method for processing, by a virtualized environment instantiated on an on-demand network, executable code to be transmitted to coordinated devices in a local environment remote from the on-demand network, the system comprising:
- obtaining executable code generated by a client device, the executable code resulting in one or more tasks to be executed by a coordinated device configured to execute on-demand tasks in accordance with a virtualized environment hosted on the coordinated device, wherein the coordinated device includes at least one accessible physical computing resource, and wherein executing the on-demand tasks by the coordinated device includes executing at least a portion of the on-demand tasks to access the at least one accessible physical computing resource;
- causing execution of the one or more tasks by the virtualized environment instantiated on the on-demand network, wherein execution of the one or more tasks results in generation of an input/output file configured to access the at least one accessible physical computing resource by attempting to write the input/output file to a designated file location local to the instance of the on-demand network;
- in response to the execution of the one or more tasks, intercepting the attempted writing of the input/output file by the virtualized environment instantiated on the on-demand network;
- transmitting the intercepted input/output file to the coordinated device in the local environment, wherein the transmitting causes the at least one accessible computing resource to process the input/output file in the local environment without executing the one or more tasks and to generate a processed input/output file;
- receiving, from the at least accessible computing resource, the processed input/output file generated at the at least one accessible computing resource based on processing the intercepted input/output file at least in part on the at least one accessible physical computing resource;
- generating a processing result of the execution of the one or more tasks based on the processed input/output file; and
- transmitting the processing result.

7. The method of claim 6 further comprising evoking a handler function, the handler function specifying outputs generated by the at least one accessible physical computing resource.

8. The method of claim 7 further comprising obtaining a configuration of the handler function.

9. The method of claim 6, wherein transmitting the intercepted input/output file to the coordinated device includes transmitting the input/output file to an agent on the coordinated device.

10. The method of claim 6, wherein transmitting the processing result includes transmitting a result of the execution of the one or more tasks.

11. The method of claim 6, wherein the at least one accessible physical computing resource comprises an embedded device within a household appliance.

12. Non-transitory computer readable media comprising instructions for processing, by a virtualized environment instantiated on an on-demand network, executable code to be transmitted to a coordinated device network in a local environment remote from the on-demand network that, when executed by a computing device, cause the computing device to:
- obtain executable code generated by a client device, the executable code resulting in one or more tasks to be executed within a coordinated device network configured to execute on-demand tasks in accordance with a virtualized environment hosted within the coordinated device network, wherein a computing device within the coordinated device network provides access to at least one accessible physical computing resource, and wherein executing the on-demand tasks within the coordinated device network includes executing at least a portion of the on-demand tasks to access the at least one accessible physical computing resource;

cause execution of the one or more tasks by the virtualized environment instantiated on the on-demand network emulating execution of the tasks in the coordinated device network, wherein execution of the one or more tasks results in generation of an input/output file configured to access the at least one accessible physical computing resource by attempting to write the input/output file to a designated file location local to the instance of the on-demand network;

in response to the execution of the one or more tasks, intercept the attempted writing of the input/output file by the virtualized environment instantiated on the on-demand network;

transmit the intercepted input/output file to the coordinated device network in the local environment, wherein the transmitting causes the at least one accessible physical computing resource to process the input/output file in the local environment without executing the one or more tasks and to generate a processed input/output file;

receive, from the at least accessible computing resource, the processed input/output file generated at the at least one accessible physical computing resource based on processing the intercepted input/output file at least in part on the at least one accessible physical computing resource;

generate a processing result of the execution of the one or more tasks based on the processed input/output file; and transmit the processing result.

13. The non-transitory computer readable media of claim 12, wherein the computing device is further configured to implement a handler function, the handler function specifying outputs generated by the at least one accessible physical computing resource.

14. The non-transitory computer readable media of claim 13, wherein the computing device obtains a configuration of a handler function.

15. The non-transitory computer readable media of claim 12, wherein the computing device is further configured to transmit the intercepted input/output file to the coordinated device network via the computing device within the coordinated device network providing access to the at least one accessible physical computing resource.

16. The non-transitory computer readable media of claim 15, wherein transmitting the input/output file to the coordinated device network includes transmitting the input/output file to an agent on the computing device within the coordinated device network providing access to the at least one accessible computing resource.

17. The non-transitory computer readable media of claim 12, wherein transmitting the processing result includes transmitting a result of the execution of the one or more tasks.

18. The non-transitory computer readable media of claim 12, wherein causing execution of the one or more tasks by a virtualized environment includes at least one of selecting an existing instance or instantiating an instance configured to emulate execution of the tasks in the coordinated device network.

19. The non-transitory computer readable media of claim 12, wherein the at least one accessible physical computing resource comprises an embedded device within a household appliance.

\* \* \* \* \*